Figure 1:
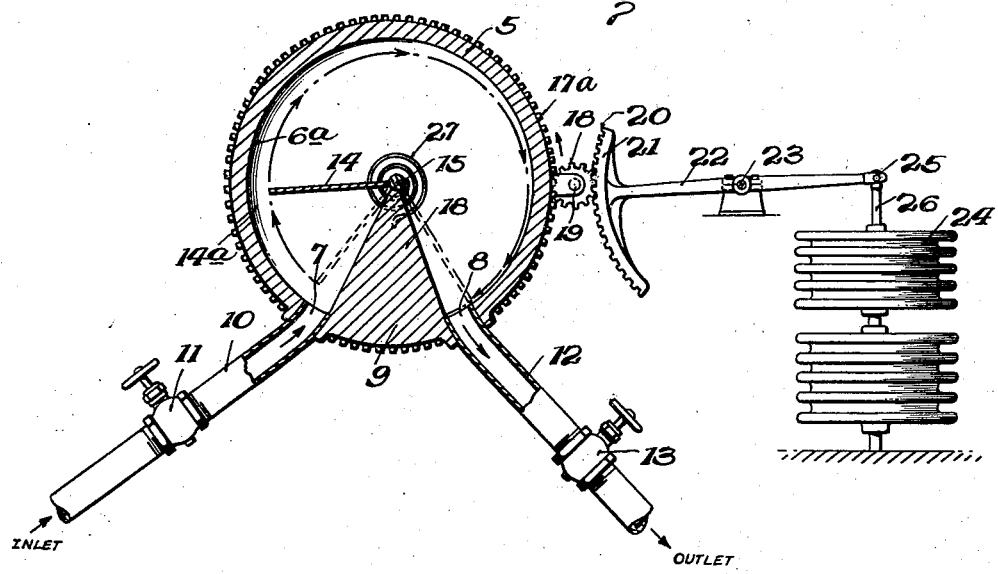

April 23, 1940.      S. CERSTVIK      2,197,922
OXYGEN REGULATOR
Filed Feb. 11, 1937

Inventor
Stephen Cerstvik
By N. D. Parker Jr.
Attorney

Patented Apr. 23, 1940

2,197,922

UNITED STATES PATENT OFFICE 2,197,922

OXYGEN REGULATOR

Stephen Cerstvik, Union, N. J., assignor to Bendix Aviation Corporation, South Bend, Ind., a corporation of Delaware Application February 11, 1937, Serial No. 125,346

8 Claims. (Cl. 137—153)

The present invention relates to fluid regulators and more particularly to oxygen regulators for use on aircraft, for supplying oxygen to the cabin or to a mask worn by the pilot.

It is desirable that the rate at which the oxygen is supplied to the consuming apparatus be varied in accordance with changes in altitude. For instance, it is particularly desirable that the oxygen supply be so varied that the greater the altitude the greater the amount of oxygen that will be passed by the regulator. This condition is desired due to the fact that as the altitude increases the amount of oxygen available per unit of air decreases and this deficiency must be supplied. Also when an oxygen mask is in use, certain physiological effects that occur with changes in altitude, require that the pilot obtain more oxygen with an increase in altitude in order to mitigate these effects.

In devices of the prior art, means for regulating a flow of oxygen have been provided wherein the supply of oxygen is automatically increased with increase in altitude. These devices are, however, very complicated and heavy and particularly objectionable because they occupy considerable space.

It is, therefore, one of the objects of the present invention to provide a novel regulator wherein these undesirable conditions are eliminated.

A further object is to provide a novel oxygen regulator which shall be simple in operation, precise and compact.

Another object is to provide in an oxygen regulator, a novel combination including means responsive to a change in a condition of the atmosphere, and means providing a spirally adjustable path for said oxygen, said responsive means determining the adjustment along said path.

The above and other objects and advantages of the invention will appear more fully hereinafter from a consideration of the detailed description which follows, taken together with the accompanying drawing wherein is illustrated an embodiment of the invention. It is expressly understood, however, that the drawing is for the purpose of illustration and description only and is not designed as a definition of the limits of the invention, reference being had for this purpose to the appended claims.

Figure 2:
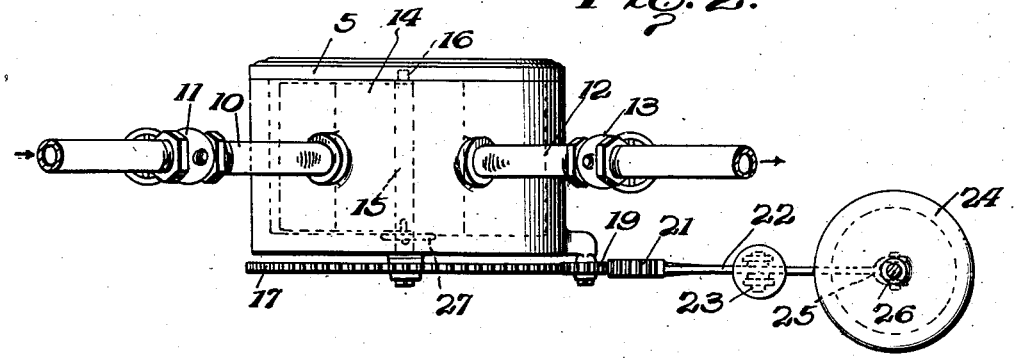

In the drawing wherein like reference characters refer to like parts throughout the several views;

Fig. 1 is a side elevation, partly in section, illustrating an embodiment of the invention; and Fig. 2 is a bottom plan view of the device as shown in Fig. 1.

Referring to the drawing, the present invention is shown as embodying an enclosure or casing 5 generally cylindrical and having a spirally shaped or eccentrically cross-sectioned interior 6a, an inlet 7 and outlet 8 disposed on opposite sides of a sector 9 formed integral with and dividing the casing.

Connected to said inlet 7 is a pipe 10 adapted to be connected to an oxygen tank (not shown) and a valve 11 is provided whereby the input of oxygen from the tank to the casing may be manually regulated in the usual manner. Connected to the outlet 8 is a pipe 12 which is adapted to pass oxygen to the cabin of an aircraft or to an oxygen mask worn by the pilot of the craft, and a valve 13 is provided whereby the output of oxygen from the casing may be manually regulated.

Rotatably mounted within said casing is a vane 14 connected to a shaft 15 journaled at one end as at 16 (see Fig. 2) and extending through the casing at its other end. Fastened to said other end is a gear 17 having teeth 17a. Means are now provided whereby the shaft 15 and vane 14 may be rotated to vary the opening 14a between the spiral shaped interior 6a and the vane 14 in accordance with changes in altitude. For this purpose the teeth 17a of gear 17 are arranged to mesh with the teeth 18 of a pinion 19, which, in turn, are arranged to mesh with the teeth 20 on sector 21. Sector 21 is carried by an arm 22 pivoted at 23 and connected to altitude responsive bellows 24 by means of a pivot 25 and link 26. The vane 14 is continuously urged in a clockwise direction by a coil spring 27 having one end connected to said vane and the other end to the partition 9.

The operation of the device is as follows: Oxygen enters inlet 7 by means of valve 11 and pipe 10 and passes to the opening 14a between vane 14 and the spiral interior 6a of casing 5. The oxygen then passes to outlet 8 and is conducted therefrom to the utilizing device by pipe 12 and valve 13. The opening 14a is controlled by changes in atmospheric pressure due to changes in altitude.

With a decrease in the atmospheric pressure that accompanies an increase in altitude, the bellows 24 expand, moving link 26 upwardly and by means of pivot 25 the right side of arm 22 is moved upwardly, thereby rotating the sector 21 about pivot 23 in a counter-clockwise direction. The counter-clockwise movement of sector 21 rotates pinion 19 clockwise to, in turn, rotate the gear wheel 17 in a counter-clockwise direction. This, in turn, rotates the shaft 15 and, hence, vane 14 in a counter-clockwise direction to increase the opening 14a between vane 14 and spiral interior 6a of casing 5. More oxygen is therefore allowed to pass through casing 5 to the outlet upon an increase in altitude.

Upon a decrease in altitude the reverse operation takes effect, the bellows 24 collapsing to move vane 14 in a clockwise direction to thereby decrease the size of opening 14a and thus diminish the supply of oxygen at the lower altitude.

There are thus provided novel means whereby the amount of oxygen supplied to a consuming device is regulated by changes in altitude to maintain the quantity of oxygen at the desired amount.

While the device has been described in connection with the control of oxygen, it is to be expressly understood that any gas may be so controlled. Further the device may be influenced by any pressures extraneous to the apparatus itself and arising in a static medium and the use thereof is not necessarily limited to atmospheric control but may be utilized wherever distribution of a flowing medium is to be controlled by variations in pressure in another and static medium in which the apparatus is steeped and extraneous or independent of the particular medium distributed and controlled.

Although but a single embodiment of the invention has been illustrated and described, further changes and modifications in form, materials and relative arrangement of parts, which will now appear to those skilled in the art, may be made without departing from the scope of the invention. Reference is therefore to be had to the appended claims for a definition of the limits of the invention.

What is claimed is:

1. In an oxygen regulator, means responsive to changes in a condition of the atmosphere accompanying changes in altitude, means providing a spirally adjustable path for said oxygen, and means actuated by said condition responsive means for regulating said path whereby the amount of oxygen passing through said regulator varies with said changes in altitude.

2. In an oxygen regulator, means providing an inlet and an outlet, means between said inlet and outlet providing a spiral path, means cooperating with said path and movable relative thereto to provide a variable opening, and means responsive to changes in a condition of the atmosphere accompanying a change in altitude for regulating said movement whereby the amount of oxygen passing through said regulator varies with said changes in altitude.

3. In a gas regulator, an eccentric casing, a vane in said casing forming a passage between them, and means for varying the relative position of said vane and casing for varying said passage, said means being responsive to changes in a condition of the atmosphere accompanying a change in altitude whereby the amount of gas passing through said regulator varies with said change in altitude.

4. In a device of the character described, an enclosure defining a space having a non-symmetrical cross-section, a wall extending from said enclosure towards the center of said space, rotatable means mounted on said wall, resilient means urging said rotatable means in one direction, and pressure responsive means for controlling said rotatable means.

5. In a device of the character described, an enclosure having an inlet and an outlet, said enclosure defining a space having a cross-section of gradually increasing diameter, rotatable means mounted at the center of said space, a partition extending from the wall of said enclosure to the center of said space, and pressure responsive means controlling the rotation of said rotatable means.

6. In a device of the class described, means providing a variable spiral path for the flow of a gas therethrough, and means responsive to changes in a condition of the atmosphere accompanying a change in altitude for regulating said path whereby the amount of gas passing through the device is varied in accordance with said changes in said altitude.

7. In an oxygen regulator, means providing a variable spiral path for the flow of oxygen therethrough, and altitude responsive means for regulating said path whereby the amount of oxygen passing through said regulator is varied in accordance with changes in altitude.

8. In an oxygen regulator, means providing a variable spiral path for the flow of oxygen therethrough, and means responsive to changes in barometric pressure for regulating said path whereby the amount of oxygen passing through said regulator is varied in accordance with said changes in barometric pressure.

STEPHEN CERSTVIK.